(No Model.)
F. P. BALDNER & H. D. SABIN.
ROTARY WHEEL HARROW.
No. 508,536. Patented Nov. 14, 1893.
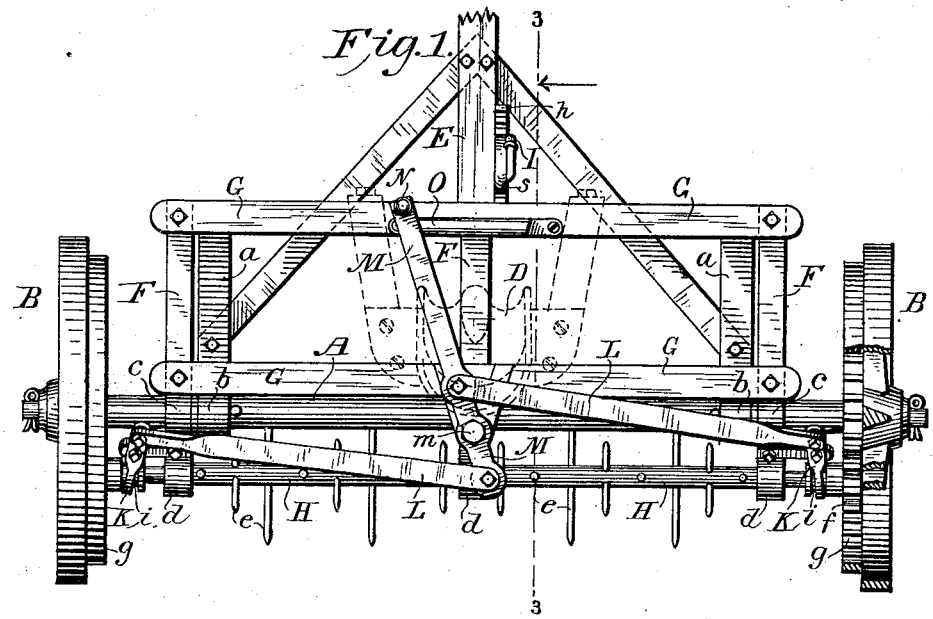
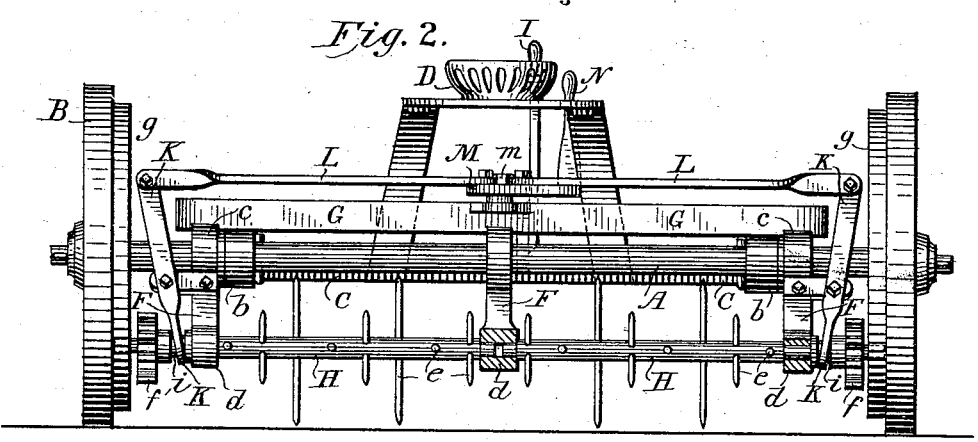
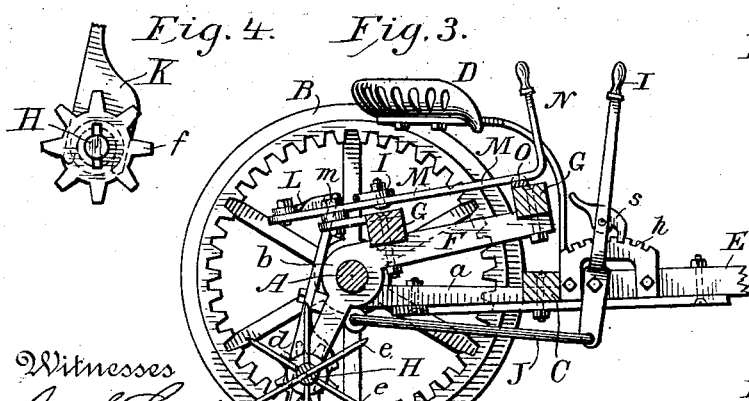
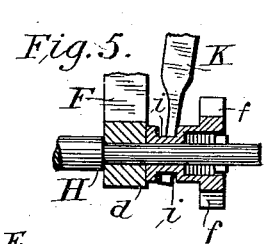
Witnesses
Inventors
Frederick P. Baldner
Horace D. Sabin
by
their Attorney

UNITED STATES PATENT OFFICE.

FREDERICK P. BALDNER AND HORACE D. SABIN, OF XENIA, OHIO.

ROTARY WHEEL-HARROW.

SPECIFICATION forming part of Letters Patent No. 508,536, dated November 14, 1893.

Application filed October 3, 1892. Serial No. 447,689. (No model.)

*To all whom it may concern:*

Be it known that we, FREDERICK P. BALDNER and HORACE D. SABIN, both of Xenia, in the county of Greene and State of Ohio, have invented certain new and useful Improvements in Rotary Wheel-Harrows, of which the following is a specification.

The present improvements relate to wheel or sulky harrows, having drive wheels and a rider's seat, and having shafts armed with harrow teeth rotatively mounted on the harrow frame and adapted to be driven by the drive wheels, said shafts being capable of being raised and lowered and of being coupled to and uncoupled from the drive wheel. The harrow can also be used as a tedder for spreading hay.

The improvements are illustrated in the accompanying drawings, wherein—

Figure 1, is a plan view of the harrow. Fig. 2, is a rear view thereof. Fig. 3, is a vertical section in a plane indicated by the line 3—3 in Fig. 1. Figs. 4, and 5, are details of the sliding pinions.

A, is the main axle of the harrow, upon which the drive wheels B B, are mounted.

C, is the main frame of the harrow, carrying the driver's seat D and the draft-pole E, said frame being preferably pivotally connected with the axle by means of the side bars $a$ $a$ constituting part of the frame, which are suspended upon the axle by collars $b$ $b$ forming the ends of said bars $a$ $a$ and embracing the axle.

The axle A and side bars $a$ $a$ of the main frame are preferably of metal. Also pivotally connected with the axle A, by collars $c$ $c$ embracing the axle, are three parallel cross bars F F, which are connected forward of the axle by two longitudinal rails G G. The cross-bars F F and rails G, G, constitute a balanced tilting tooth frame. The bars F F are preferably of metal, the collars $c$ $c$ constituting a part thereof. Each collar $c$ is at approximately the middle of its bar F, and the rear end of each bar F extends downwardly and backwardly below and behind the axle where it terminates in a sleeve $d$. One of the bars F, is at the center of the axle A, and the other two are near the ends thereof and near the drive wheels. The three sleeves $d$ $d$ $d$ at the rear lower ends of the bars F constitute bearings for two independently-mounted tooth shafts H H. These two tooth shafts are parallel with the axle A, and are in line with each other. Each tooth shaft is armed with a plurality of teeth $e$ $e$ which are preferably radially and spirally mounted on the shaft. Each shaft extends outwardly beyond its outer bearing $d$, and exterior to said outer bearing it carries a driven pinion $f$ which meshes with an internal gear $g$ carried by the adjacent drive-wheel B. The shafts H, with their teeth $e$ are thus driven by the traction wheels B, B, and owing to the two tooth shafts F F being independently mounted, each is driven by its traction wheel B independently of the other, whereby the harrow may be readily turned within a short radius.

The pivotal connection between the tilting tooth frame and the axle permits the tooth shafts to be elevated and depressed so that the teeth may either encounter the earth to harrow the same, or may be elevated above the surface of the ground so as to be entirely free therefrom, as when the harrow is being driven to and from the plowed field, or when rocks or other obstructions are encountered in the field. To effect the tilting of the tooth frame and to enable it to be maintained in any desired position within the limits of its movement, a lever I is pivoted to the main frame, with its handle end within convenient reach from the driver's seat D, and its lower end connected by a link J with the tooth-frame; and the lever I carries a dog $s$ co-operating with a fixed rack $h$ on the main harrow-frame whereby the tilting tooth-frame may be maintained in different positions, said dog $g$ being located so as to be conveniently operated by the foot of the occupant of the driver's seat D.

Since the bearings of the tooth shafts F F during the adjustment of the tilting tooth-frame swing concentrically with the axle A, the pinions $f$ would (unless provision were made to the contrary) always remain in mesh with the gears $g$ in the traction wheels, which would be disadvantageous since it is unnecessary that the shafts F should revolve except when in the process of harrowing. Accordingly provision is made for coupling and uncoupling the pinions $f$ and gears $g$. To this end the pinions $f$ are feathered to the shafts F so that they may slide thereon into and out of mesh with the gears $g$. The hubs of the pinions $f f$ have annular grooves $i\ i$ respectively, with which co-operate the forked ends respectively of forked levers K which are centrally pivoted to the tilting tooth-frame, their upper ends being connected by links L L respectively to an operating lever M, the points of connection between the links L, L, and operating lever M being on opposite sides of the pivotal connection $m$ between said lever M and the tilting tooth-frame. The front end of lever M has a handle N within convenient reach of the occupant of the driver's seat D. When the lever M occupies its position shown in Fig. 1, both pinions $f$ are in gear with gears $g$, and when lever M occupies the position shown in Fig. 2, both pinions are out of gear, the two pinions being simultaneously operated. To maintain the lever M in these two positions, the lever M co-operates with a notched retaining bar O on the tilting frame, the lever M being made of metal and being sufficiently elastic to engage the notches in the retaining bar O, and to be readily disengaged therefrom. It will be noted that when the pinions are uncoupled from the gears $g$ nothing is driven by the traction wheels and they are relieved from all friction due to such driven parts.

The improved harrow can be conveniently used as a tedder for spreading hay, the adjustment of the tilting tooth-frame permitting the teeth $e\ e$ to be placed at the proper height for this purpose.

We claim as our invention—

The combination of axle A, wheels B B mounted on said axle and having gears $g\ g$, main frame C comprising bars $a\ a$ with collars $b\ b$ embracing said axle, seat D carried by said main frame, a tilting tooth-frame composed of bars F F having collars $c\ c$ embracing said axle and bearings $d\ d$, and of rails G G connecting said bars F F forward of said axle, shafts H H mounted independently of each other back of said axle and having teeth $e\ e$ and sliding pinions $f\ f$ with grooves $i\ i$, said pinions co-operating with said gears $g\ g$, lever I pivoted to said main frame forward of the axle, link J connected at its forward end to said lever I and at its rear end to said tilting tooth frame back of the axle, levers K K pivoted to the outer bars F F of the tilting tooth frame with their lower ends engaging the grooves $i\ i$ of the pinions $f f$ respectively, operating lever M pivoted to the tilting tooth frame, and links L L pivoted at their outer ends to the levers K K respectively and at their inner ends to the lever M on opposite sides of the pivot thereof, said lever M having handle N and retaining bar O, substantially as set forth.

In testimony that we claim the invention above set forth we affix our signatures in presence of two witnesses.

FREDERICK P. BALDNER.
   HORACE D. SABIN.

Witnesses:
 JAMES P. TOWNSBY,
 HEBER DOUTHETT.